United States Patent
Haun et al.

(10) Patent No.: US 6,259,996 B1
(45) Date of Patent: *Jul. 10, 2001

(54) ARC FAULT DETECTION SYSTEM

(75) Inventors: Andy A. Haun; Alan G. Coats; Kon B. Wong, all of Cedar Rapids; Robert F. Dvorak; Gary W. Scott, both of Mount Vernon, all of IA (US)

(73) Assignee: Square D Company, Palatine, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 20 days.

(21) Appl. No.: 09/129,685

(22) Filed: Aug. 5, 1998

Related U.S. Application Data

(63) Continuation-in-part of application No. 09/026,193, filed on Feb. 19, 1998.

(51) Int. Cl.[7] ................................ H02H 3/10
(52) U.S. Cl. .................. 702/58; 702/64; 702/66; 702/69; 361/63; 361/87; 700/292; 700/293
(58) Field of Search ............... 702/58, 59, 57, 702/64–66, 69–76, 78, 79, 182–185, 190, 191, 193, 195, FOR 103, FOR 104, FOR 166, FOR 106–FOR 110; 364/528.27–528.29, 528.31; 324/520, 536, 613, 614, 424, 76.41–76.45, 521, 522, 541, 544, 546, 547; 361/40, 42, 113, 45, 49, 62, 63, 43, 46–50, 93.6, 65, 78–80, 87, 89, 93.1, 99, 111, 119, 2, 5; 340/649, 650, 658, 659, 664, 635, 638, 647; 335/18, 201; 455/67.3; 700/292–294

(56) References Cited

U.S. PATENT DOCUMENTS

| | | | |
|---|---|---|---|
| H536 | 10/1988 | Strickland et al. | 324/456 |
| H538 | 11/1988 | Betzold | 89/134 |
| Re. 30,678 | 7/1981 | Van Zeeland et al. | 361/44 |
| 2,808,566 | 10/1957 | Douma | 324/127124c |
| 2,832,642 | 4/1958 | Lennox | 299/132 |
| 2,898,420 | 8/1959 | Kuze | 200/87 |

FOREIGN PATENT DOCUMENTS

| | | | |
|---|---|---|---|
| 0094 871A1 | 5/1983 | (EP) . | |
| 0615327A2 | 9/1994 | (EP) | H02H/1/00 |
| 0649207A1 | 4/1995 | (EP) . | |
| 0748021A1 | 12/1996 | (EP) . | |
| 0762591A2 | 3/1997 | (EP) . | |
| 0802602A2 | 10/1997 | (EP) . | |

(List continued on next page.)

OTHER PUBLICATIONS

Antonio N. Paolantonio, P.E., Directional Couplers, R.F. Design, Sep./Oct., 1979, pp. 40–49.

Alejandro Duenas, J., Directional Coupler Design Grahphs For Parallel Coupled Lines and Interdigitated 3 dB Couplers, RF Design, Feb., 1986, pp. 62–64.

(List continued on next page.)

Primary Examiner—Hal Wachsman
(74) Attorney, Agent, or Firm—Kareem M. Trfan; Larry I. Golden

(57) ABSTRACT

An arc fault detector system detects arcing faults in an electrical distribution system by monitoring one or more conductors and producing an input signal representing one or more electrical signal conditions in the circuit to be monitored. This input signal is processed to develop signals representing the electrical current flow through the monitored circuit and broadband noise signal components. The system analyzes these signals to determine whether an arcing fault is present, and if so, outputs a trip signal which may be used directly or indirectly to trip a circuit breaker or other circuit interruption device.

30 Claims, 10 Drawing Sheets

U.S. PATENT DOCUMENTS

| | | | |
|---|---|---|---|
| 3,471,784 | 10/1969 | Arndt et al. | 324/126 |
| 3,538,241 | 11/1970 | Rein | 174/143 |
| 3,588,611 | 6/1971 | Lambden et al. | 317/31 |
| 3,600,502 | 8/1971 | Wagenaar et al. | 174/143 |
| 3,622,872 | 11/1971 | Boaz et al. | 324/52 |
| 3,660,721 | 5/1972 | Baird | 361/55 |
| 3,684,955 | 8/1972 | Adams | 324/72 |
| 3,716,757 | 2/1973 | Rodriguez | 317/40 |
| 3,746,930 | 7/1973 | Van Best et al. | 317/31 |
| 3,775,675 | 11/1973 | Freeze et al. | 324/51 |
| 3,812,337 | 5/1974 | Crosley | 235/153 AC |
| 3,858,130 | 12/1974 | Misencik | 335/18 |
| 3,869,665 | 3/1975 | Kenmochi et al. | 324/72 |
| 3,878,460 | 4/1975 | Nimmersjo | 324/52 |
| 3,911,323 | 10/1975 | Wilson et al. | 317/18 |
| 3,914,667 | 10/1975 | Waldron | 317/36 |
| 3,932,790 | 1/1976 | Muchnick | 317/18 D |
| 3,939,410 | 2/1976 | Bitsch et al. | 324/72 |
| 4,052,751 | 10/1977 | Shepard | 361/50 |
| 4,074,193 | 2/1978 | Kohler | 324/126 |
| 4,081,852 | 3/1978 | Coley et al. | 361/45 |
| 4,087,744 | 5/1978 | Olsen | 324/51 |
| 4,156,846 | 5/1979 | Harrold et al. | 324/158 |
| 4,166,260 | 8/1979 | Gillette | 335/20 |
| 4,169,260 | 9/1979 | Bayer | 340/562 |
| 4,214,210 | 7/1980 | O'Shea | 455/282 |
| 4,233,640 | 11/1980 | Klein et al. | 361/44 |
| 4,245,187 | 1/1981 | Wagner et al. | 324/54 |
| 4,251,846 | 2/1981 | Pearson et al. | 361/30 |
| 4,264,856 | 4/1981 | Frierdich et al. | 322/25 |
| 4,316,187 | 2/1982 | Spencer | 340/664 |
| 4,344,100 | 8/1982 | Davidson et al. | 361/45 |
| 4,354,154 | 10/1982 | Schiemann | 324/51 |
| 4,356,443 | 10/1982 | Emery | 324/51 |
| 4,378,525 | 3/1983 | Burdick | 324/127 |
| 4,387,336 | 6/1983 | Joy et al. | 324/51 |
| 4,459,576 | 7/1984 | Fox et al. | 336/84 |
| 4,466,071 | 8/1984 | Russell, Jr. | 364/492 |
| 4,477,855 | 10/1984 | Nakayama et al. | 361/54 |
| 4,587,588 | 5/1986 | Goldstein | 361/54 |
| 4,616,200 | 10/1986 | Fixemer et al. | 335/35 |
| 4,639,817 | 1/1987 | Cooper et al. | 361/62 |
| 4,642,733 | 2/1987 | Schacht . | |
| 4,644,439 | 2/1987 | Taarning | 361/87 |
| 4,652,867 | 3/1987 | Masot | 340/638 |
| 4,658,322 | 4/1987 | Rivera | 361/37 |
| 4,697,218 | 9/1987 | Nicolas | 633/882 |
| 4,702,002 | 10/1987 | Morris et al. | 29/837 |
| 4,707,759 | 11/1987 | Bodkin | 831/642 |
| 4,771,355 | 9/1988 | Emery et al. | 361/33 |
| 4,810,954 | 3/1989 | Fam | 324/142 |
| 4,816,958 | 3/1989 | Belbel et al. | 361/93 |
| 4,833,564 | 5/1989 | Pardue et al. | 361/93 |
| 4,835,648 | 5/1989 | Yamauchi | 361/14 |
| 4,839,600 | 6/1989 | Kuurstra | 324/127 |
| 4,845,580 | 7/1989 | Kitchens | 361/91 |
| 4,847,719 | 7/1989 | Cook et al. | 361/13 |
| 4,853,818 | 8/1989 | Emery et al. | 361/33 |
| 4,858,054 | 8/1989 | Franklin | 361/57 |
| 4,866,560 | 9/1989 | Allina | 361/104 |
| 4,882,682 | 11/1989 | Takasuka et al. | 364/507 |
| 4,893,102 | 1/1990 | Bauer | 335/132 |
| 4,901,183 | 2/1990 | Lee | 361/56 |
| 4,922,368 | 5/1990 | Johns | 361/62 |
| 4,931,894 | 6/1990 | Legatti | 361/45 |
| 4,939,495 | 7/1990 | Peterson et al. | 337/79 |
| 4,949,214 | 8/1990 | Spencer | 361/95 |
| 4,969,063 | 11/1990 | Scott et al. | 361/93 |
| 5,010,438 | 4/1991 | Brady | 361/56 |
| 5,047,724 | 9/1991 | Boksiner et al. | 324/520 |
| 5,051,731 | 9/1991 | Guim et al. | 340/638 |
| 5,121,282 | 6/1992 | White | 361/42 |
| 5,166,861 | 11/1992 | Krom | 361/379 |
| 5,168,261 | 12/1992 | Weeks . | |
| 5,179,491 | 1/1993 | Runyan | 361/45 |
| 5,185,684 | 2/1993 | Beihoff et al. | 361/45 |
| 5,185,685 | 2/1993 | Tennies et al. | 361/45 |
| 5,185,686 | 2/1993 | Hansen et al. | 361/45 |
| 5,185,687 | 2/1993 | Beihoff et al. | 361/45 |
| 5,206,596 | 4/1993 | Beihoff et al. | 324/536 |
| 5,208,542 | 5/1993 | Tennies et al. | 324/544 |
| 5,223,795 | 6/1993 | Blades | 324/536 |
| 5,224,006 | 6/1993 | MacKenzie et al. | 361/45 |
| 5,257,157 | 10/1993 | Epstein | 361/111 |
| 5,280,404 | 1/1994 | Ragsdale | 361/113 |
| 5,286,933 | 2/1994 | Pham . | |
| 5,307,230 | 4/1994 | MacKenzie | 361/96 |
| 5,334,939 | 8/1994 | Yarbrough . | |
| 5,353,014 | 10/1994 | Carroll et al. | 340/638 |
| 5,359,293 | 10/1994 | Boksiner et al. | 324/544 |
| 5,363,269 | 11/1994 | McDonald . | |
| 5,373,241 | * 12/1994 | Han, Jr. et al. | 324/520 |
| 5,383,084 | 1/1995 | Gershen et al. | 361/113 |
| 5,388,021 | 2/1995 | Stahl | 361/56 |
| 5,396,179 | 3/1995 | Domenichini et al. | 324/546 |
| 5,412,526 | 5/1995 | Kapp et al. | 361/56 |
| 5,412,590 | 5/1995 | Tajali | 361/669 |
| 5,420,740 | 5/1995 | MacKenzie et al. | 361/45 |
| 5,424,894 | 6/1995 | Briscall et al. | 361/45 |
| 5,434,509 | 7/1995 | Blades | 324/536 |
| 5,444,424 | 8/1995 | Wong et al. | 335/172 |
| 5,446,431 | 8/1995 | Leach et al. | 335/18 |
| 5,448,443 | 9/1995 | Muelleman | 361/111 |
| 5,452,223 | 9/1995 | Zuercher et al. | 364/483 |
| 5,459,630 | 10/1995 | MacKenzie et al. | 361/45 |
| 5,473,494 | 12/1995 | Kurosawa et al. | 361/3 |
| 5,477,150 | 12/1995 | Ham, Jr. et al. | 324/536 |
| 5,481,235 | 1/1996 | Heise et al. | 335/18 |
| 5,483,211 | 1/1996 | Carrodus et al. | 335/18 |
| 5,485,093 | 1/1996 | Russell et al. | 324/522 |
| 5,493,278 | 2/1996 | MacKenzie et al. | 340/638 |
| 5,499,189 | * 3/1996 | Seitz | 324/536 |
| 5,506,789 | 4/1996 | Russell et al. | 364/492 |
| 5,510,946 | 4/1996 | Franklin . | |
| 5,512,832 | 4/1996 | Russell et al. | 324/522 |
| 5,519,561 | 5/1996 | Mrenna et al. | 361/105 |
| 5,531,617 | 7/1996 | Marks | 439/723 |
| 5,546,266 | 8/1996 | Mackenzie et al. | 361/93 |
| 5,561,605 | 10/1996 | Zuercher et al. | 364/483 |
| 5,568,371 | 10/1996 | Pitel et al. | 363/39 |
| 5,578,931 | 11/1996 | Russell et al. | 324/536 |
| 5,590,010 | 12/1996 | Ceola et al. | 361/93 |
| 5,590,012 | 12/1996 | Dollar | 361/113 |
| 5,602,709 | 2/1997 | Al-Dabbagh | 361/85 |
| 5,608,328 | 3/1997 | Sanderson | 324/529 |
| 5,617,019 | 4/1997 | Etter | 324/117 |
| 5,638,244 | * 6/1997 | Mekanik et al. | 361/62 |
| 5,657,244 | 8/1997 | Seitz | 364/492 |
| 5,659,453 | 8/1997 | Russell et al. | 361/93 |
| 5,661,645 | 8/1997 | Hochstein | 363/89 |
| 5,682,101 | 10/1997 | Brooks et al. | 324/536 |
| 5,691,869 | 11/1997 | Engel et al. . | |
| 5,701,110 | 12/1997 | Scheel et al. | 335/132 |
| 5,706,154 | 1/1998 | Seymour | 361/42 |
| 5,726,577 | 3/1998 | Engel et al. | 324/536 |
| 5,729,145 | 3/1998 | Blades | 324/536 |
| 5,764,125 | 6/1998 | May | 336/92 |
| 5,805,397 | 9/1998 | MacKenzie | 361/42 |
| 5,805,398 | 9/1998 | Rae | 361/42 |
| 5,815,352 | 9/1998 | Mackenzie | 361/42 |
| 5,818,237 | 10/1998 | Zuercher et al. | 324/536 |

| | | | | |
|---|---|---|---|---|
| 5,818,671 | 10/1998 | Seymour et al. | ........................ | 361/42 |
| 5,825,598 | 10/1998 | Dickens et al. | ........................ | 361/42 |
| 5,834,940 | 11/1998 | Brooks et al. | ........................ | 324/424 |
| 5,835,319 | 11/1998 | Welles, II et al. | ........................ | 361/5 |
| 5,835,321 | 11/1998 | Elms et al. | ........................ | 361/45 |
| 5,839,092 | 11/1998 | Erger et al. | ........................ | 702/58 |
| 5,847,913 | 12/1998 | Turner et al. | ........................ | 361/93 |
| 5,886,861 | 3/1999 | Parry | ........................ | 361/42 |
| 5,889,643 | 3/1999 | Elms | ........................ | 361/42 |
| 5,896,262 | 4/1999 | Rae et al. | ........................ | 361/94 |
| 5,905,619 | 5/1999 | Jha | ........................ | 361/93 |
| 5,933,308 | 8/1999 | Garzon | ........................ | 361/62 |
| 5,946,179 | 8/1999 | Fleege et al. | ........................ | 361/93 |

FOREIGN PATENT DOCUMENTS

| | | |
|---|---|---|
| 0813281A2 | 12/1997 | (EP) . |
| 2177561A | 6/1985 | (GB) . |
| 2285886A | 7/1995 | (GB) . |
| 0158365 | 6/1989 | (JP) . |
| WO 92/08143 | 5/1992 | (WO) . |
| WO 97/30501 | 8/1997 | (WO) . |

OTHER PUBLICATIONS

RV4145 Low Power Ground Fault Interrupter, Preliminary Product Specifications of Integrated Circuits, Raytheon Company Semiconductor Division, 350 Ellis Street, Mountain View CA 94309–7016, pp. 1–8. (No date).

Jean–Francois Joubert, Feasibility of Main Service Ground––Fault Protection On The Electrical Service To Dwelling Units, Consultants Electro–Protection Ins., 1980, Michelin St., Laval, Quebec H7L 9Z7. Oct. 26, 1990, pp. 1–77.

B.D. Russell, Detection Of Arcing Faults On Distribution Feeders, Texas A & M Research Foundation, Box H. College Station, Texas 77843, Final Report Dec., 1982, pp. 1–B18.

* cited by examiner slow_rise = peak1-max_di/dt1

ARC FAULT DETECTION SYSTEM

CROSS-REFERENCE TO RELATED APPLICATIONS

This application is a continuation-in-part of copending application, Ser. No. 09/026,193, filed Feb. 19, 1998 which has the same assignee as this application, and is incorporated herein by reference in its entirety.

FIELD OF THE INVENTION

The present invention relates to the protection of electrical circuits and, more particularly, to the detection of electrical faults of the type known as arcing faults in an electrical circuit.

BACKGROUND OF THE INVENTION

The electrical systems in residential, commercial and industrial applications usually include a panelboard for receiving electrical power from a utility source. The power is then routed through protection devices to designated branch circuits supplying one or more loads. These overcurrent devices are typically circuit interrupters such as circuit breakers and fuses which are designed to interrupt the electrical current if the limits of the conductors supplying the loads are surpassed.

Circuit breakers are a preferred type of circuit interrupter because a resetting mechanism allows their reuse. Typically, circuit breakers interrupt an electric circuit due to a disconnect or trip condition such as a current overload or ground fault. The current overload condition results when a current exceeds the continuous rating of the breaker for a time interval determined by the trip current. A ground fault trip condition is created by an imbalance of currents flowing between a line conductor and a neutral conductor which could be caused by a leakage current or an arcing fault to ground.

Arcing faults are commonly defined as current through ionized gas between two ends of a broken conductor or at a faulty contact or connector, between two conductors supplying a load, or between a conductor and ground. However, arcing faults may not cause a conventional circuit breaker to trip. Arcing fault current levels may be reduced by branch or load impedance to a level below the trip curve settings of the circuit breaker. In addition, an arcing fault which does not contact a grounded conductor or person will not trip a ground fault protector.

There are many conditions that may cause an arcing fault. For example, corroded, worn or aged wiring, connectors, contacts or insulation, loose connections, wiring damaged by nails or staples through the insulation, and electrical stress caused by repeated overloading, lightning strikes, etc. These faults may damage the conductor insulation and cause the conductor to reach an unacceptable temperature.

OBJECTS AND SUMMARY OF THE INVENTION

It is an object of the present invention to provide an arc fault detection system and method which reliably detects arc fault conditions which may be ignored by conventional circuit interrupters.

Another object of the invention is to provide an arc fault detection system which utilizes a minimum number of highly reliable electronic signal processing components, such as a microcontroller, to perform most of the signal processing and analyzing functions, so as to be relatively simple and yet highly reliable in operation.

Other and further objects and advantages of the invention will be apparent to those skilled in the art from the present specification taken with the accompanying drawings and appended claims.

In accordance with one aspect of the invention, there is provided a method of determining whether arcing is present in an electrical circuit comprising the steps of sensing a change in current in said circuit and developing a corresponding input signal, analyzing said input signal to determine the presence of broadband noise in a predetermined range of frequencies, and producing a corresponding output signal, and processing said current signal and said output signal in a predetermined fashion to determine whether an arcing fault is present in said circuit.

In accordance with another aspect of the invention, there is provided a system for determining whether arcing is present in an electrical circuit comprising a sensor for sensing a changing current in said circuit and developing a corresponding sensor signal, a circuit for analyzing said sensor signal to determine the presence of broadband noise in a predetermined range of frequencies, and producing a corresponding output signal, and a controller for processing said sensor signal and said output signal in a predetermined fashion to determine whether an arcing fault is present in said circuit.

In accordance with another aspect of the invention, there is provided a controller for determining whether arcing is present in an electrical circuit in response to input signals, said input signals corresponding to a changing current in said circuit and to the presence of broadband noise in a predetermined range of frequencies in said circuit, said controller including a plurality of counters and wherein said controller increments said plurality of counters in a predetermined fashion in accordance with said input signals and periodically determines whether an arcing fault is present based at least in part on the state of said plurality of counters.

In accordance with another aspect of the invention, there is provided a method of determining whether arcing is present in an electrical circuit by processing input signals corresponding to a changing current in said circuit and to the presence of broadband noise in a predetermined range of frequencies in said circuit, said method comprising the steps of incrementing a plurality of counters in a predetermined fashion in accordance with said input signals, and periodically determining whether an arcing fault is present based at least in part on the state of said plurality of counters.

DESCRIPTION OF ILLUSTRATIVE EMBODIMENTS

Figure 1:
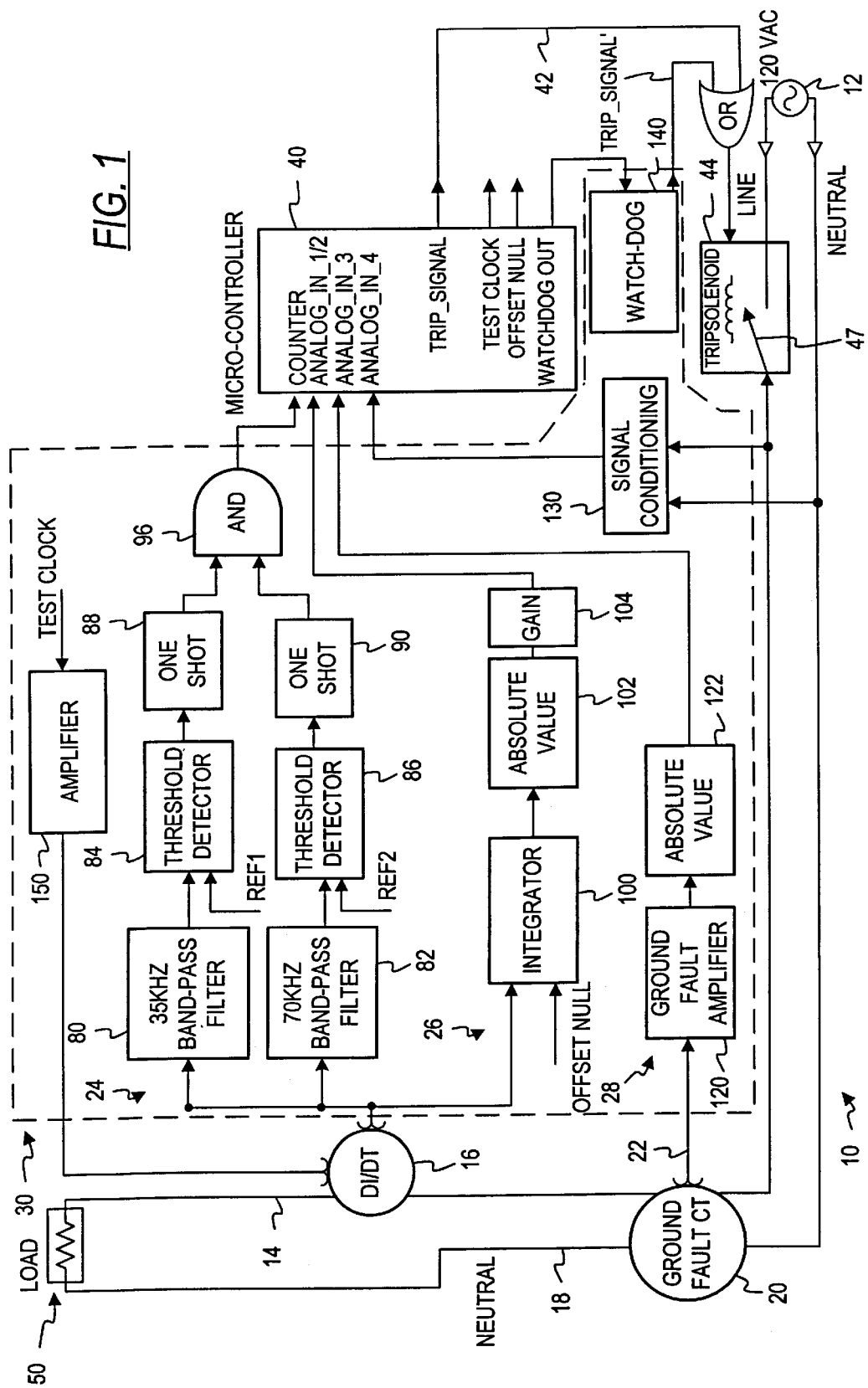
FIG. 1 is a functional block diagram of an arc fault detection system embodying the invention.

Referring now to the drawings in initially to FIG. 1, there is shown in block form a novel electrical fault detector system in accordance with the invention, and designated generally by the reference numeral 10. In the illustrative example, the fault detection system 10 is associated with an electrical circuit such as a 120 VAC circuit 12 which is to be monitored for faults. Of course, the invention is not limited to use with a 120 VAC circuit. At least one sensor 16 is provided in association with the 120 VAC circuit 12 for producing a signal representative of a signal condition, such as power, voltage or current in the 120 VAC circuit 12. In the illustrated embodiment, this sensor 16 comprises a current rate of change sensor (di/dt). A line conductor 14 of the 120 VAC circuit 12 passes through the rate of change current sensor (di/dt) 16 which produces a current input signal representative of the rate of change of current flow in the line conductor 14. In the illustrative embodiment, both the line conductor 14 and a neutral conductor 18 of the 120 VAC circuit 12 pass through a ground fault detector or sensor 20 which is responsive to the current flowing through the line and neutral sides of the circuit 12 for producing an output signal at an output 22. If the current flow through the line and neutral conductors is different, this is indicative of a ground fault.

Preferably, the di/dt sensor 16 and the ground fault sensor 20 each comprise a toroidal coil having an annular core which surrounds the relevant conductors, with a toroidal sensing coil wound helically on the core. In the sensor 16, the core may be made of magnetic material such as ferrite, iron or molded permeable powder, such that the sensor is capable of responding to rapid changes in flux. An air gap may be cut into the core in certain instances to reduce the permeability, and the core material is such that it does not saturate during the relatively high current produced by some forms of arcing, so that arc detection is still possible. The particular requirements for the construction of the toroidal coil and core for the ground fault sensor 20 may differ somewhat for those for the di/dt sensor 16, such ground fault sensors or transformers being generally known in the art.

The di/dt sensor 16 provides an input to an arcing fault detector circuit 24 which is preferably a broadband noise detector circuit and a current fault detector circuit 26 which is preferably a current measuring circuit. The ground fault sensor 20 provides an input signal at line 22 to a ground fault detector circuit 28. In the illustrated embodiment, all of the components of the arcing fault circuit detector 24, the current fault detector circuit 26 and the ground fault detector circuit 28, as well as some other circuit components to be described later, are provided on an application specific integrated circuit (ASIC) 30. Suitable output signals from the ASIC 30 are fed to a microcontroller 40 which, based on analysis and further processing of the signals provided by the ASIC 30 makes a decision as to whether to send a trip signal to an output 42 for activating a trip circuit 44 which will in effect switch the line side conductor 14 of the 120 VAC circuit 12 to an open circuit condition as indicated diagrammatically in FIG. 1, or whether to allow the line side 14 of the circuit 12 to remain connected to a load 50.

Referring still to FIG. 1, additional components of the ASIC 30 will next be described.

The broadband noise detector 24 comprises first and second band-pass filter circuits 80, 82 which receive the rate of change of current signal from the di/dt sensor 16. In accordance with the invention, the band passes of these circuits 80 and 82 are selected at frequency bands which are representative of a frequency spectrum typical of arcing faults so as to substantially (statistically) eliminate signals at frequencies which may occur on the line which do not represent, that is are not due to, an arcing fault. In the illustrative embodiment, these band-pass frequencies are selected as typically 35 kilohertz and 70 kilohertz respectively. Each of the band-pass filter circuits 80 and 82 feeds a filtered signal, comprising those components of an input signal from the di/dt sensor which fall within their respective band-pass frequency bands, to respective threshold detector circuits 84 and 86.

The threshold detectors 84 and 86 are responsive to those components of the frequency signals passed by the band-pass filters 80 and 82 which are above a predetermined threshold amplitude for producing a corresponding frequency amplitude output to signal conditioning circuits 88 and 90. These circuits 88 and 90 produce a conditioned output signal in a form suitable for input into the microcontroller 40. In the illustrative embodiment, these latter signal conditioning circuits 88 and 90 comprise ten microsecond one-shot circuits for producing a unit pulse signal. The output pulses generated by the one-shots 88 and 90 are ANDed at an AND circuit 96 whose output is fed to a "counter" input of the microcontroller 40 as indicated in FIG. 1. In the illustrative embodiment, a one volt threshold is utilized by both of the threshold circuits 84 and 86.

Referring still to FIG. 1, the current fault sensor or current measuring portion 26 of the ASIC 30 also receives the output signal of the di/dt sensor 16. An integrator circuit 100 develops a signal representative of current magnitude in response to the output of the di/dt sensor 16. This signal is fed to a further signal conditioning circuit portion 102 which includes an absolute value circuit as shown in FIG. 1 and a gain circuit 104 for producing a conditioned current output signal in a form suitable for input to the controller 40.

The absolute value circuit 102 takes signals that are both negative- and positive-going and invert any negative going signals to positive signals while passing through positive-going signals unchanged.

The output of the absolute value circuit 102 is fed into the gain circuit 104 which in one embodiment includes a low current gain stage and a high current gain stage. Briefly, the low current gain stage applies a relatively greater amount of gain to relatively low currents so as to increase the resolution of the current signal for relatively low current levels. On the other hand, the high current gain stage applies a relatively lower gain to relatively higher current levels in order to maintain a full range of current signal levels through the circuit. The outputs of the respective low current and high current gain stages are fed to the microcontroller 40.

Referring still to FIG. 1, the ground fault sensor 20 feeds a ground fault amplifier 120 and an absolute value circuit 122 which form the ground fault detector circuit 28. The ground fault amplifier 120 essentially amplifies the low level difference in current flow between the line 14 and neutral 18 as detected by the ground fault sensor 20. The absolute value circuit 122 is similar in its operation and function to the absolute value circuit 102 described above in that it essentially turns negative-going signals into positive signals and passes positive-going signals through unchanged.

The line voltage is also conditioned at a circuit 130 and fed to the microcontroller for further analysis and processing. This circuit 130 includes a line voltage divider (not shown) which divides the line voltage to a lower level suitable for further processing, a difference amplifier (not shown) which takes the output of the line voltage divider and level shifts it to circuit ground to be rectified, and an absolute value circuit. The voltage from the difference amplifier (not shown) is fed through the absolute value circuit which has the same configuration and function as described above for the previously described absolute value circuits. The output of signal conditioning circuit 130 is fed to the microcontroller 40.

Referring still to FIG. 1, a watchdog circuit 140 takes a pulse input (Pulse_In) from the microcontroller 40 to check to see if the microcontroller is still active. If no pulses are present on this output from the microcontroller then a trip signal (Trip_Signal') is sent to the trip circuit by the watchdog circuit 140.

As indicated above, FIG. 1 illustrates one embodiment of an application specific integrated circuit for performing the above-described operations. Further details of the construction and operation of the circuit of FIG. 1 are described in the above-referenced copending application, Ser. No. 09/026,193, filed Feb. 19, 1998, which has been incorporated by reference.

Provision of the detector circuit as an ASIC is advantageous, in that it permits the circuitry to be readily incorporated into a variety of environments. This is mainly due to the small size and relatively modest power requirements of the ASIC. That is, this detector circuit can be incorporated not only in panel boards or other distribution apparatus, but could also be located at individual loads. This is true for industrial, as well as and commercial and residential applications. For example, the detector circuit ASIC could be incorporated in electrically powered industrial and/or commercial equipment or machinery, as well as in consumer products such as computers, audiovisual equipment, appliances or the like.

This invention analyzes current waveforms and broadband noise to determine if arcing is present in electrical conductors. A high current arc is identified as a current waveform that has a combination of changes in current (di/dt) and broadband noise (10 kHz to 100 kHz). The controller 40 increments a plurality of counters, which may be implemented in software, in accordance with the input signals received from the ASIC 30. Table 1 summarizes high current arcing characteristic of current waveforms and how firmware counters are incremented. A detailed description of how the counters are used to determine if an arc is present is described later.

Conditions exist where loads have broadband noise, large (di/dt) and high currents under normal operating conditions. To distinguish between normally noisy load currents and arcing currents, the algorithms looks for different levels of (di/dt) broad band noise, high currents, decaying currents and current aspect ratios*.

Broadband noise is calculated as logically anding two or more frequency bands in hardware as described above. If broadband noise is present then pulses are received at the microcontroller input. The pulses are counted every half cycle, stored and then reset to detect broadband noise levels in the next half cycle.

TABLE 1

(each row characterizes an arcing half cycle)

| peak current with aspect ratio > 2 | (di/dt) (dt = 500 us) | high frequency broad band noise | high current arc counter | (di/dt) counter | high frequency counter |
|---|---|---|---|---|---|
| >48A | >0.328 × peak current | not required | increment | increment | unchanged |
| >48A | >0.328 × peak current | present | increment | increment | increment |
| >48A | >0.203 × peak current | required | increment | unchanged | increment |
| >48A | >0.25 × peak current | required | increment | increment | increment | wherein:

aspect ratio is the peak divided by the area for one half cycle. Area is the sum of 32 samples for one half cycle.

dt is the time between every other sample of the current waveform. This sample time varies dynamically with the line frequency (60±4 Hz) to get better coverage of the current waveform.

high frequency broadband noise is the presence of broadband noise during the first 20 half cycles on power-up of the module with a load connected and turned on, and normal operation due to noisy loads at steady state (currents below 48 Apeak).

A block diagram of a typical application for a residential arc fault circuit breaker is shown in the attached FIG. 1. Arcing and startup current waveforms are analyzed by the controller using the algorithms described in the following description and attached flow charts.

The firmware contains the following counters and other variables:

di/dt1 (holds the maximum di/dt one half cycle ago)

di/dt2 (holds the maximum di/dt two half cycles ago)

di/dt3 (holds the maximum di/dt three half cycles ago)

di/dt4 (holds the maximum di/dt four half cycles ago)

di/dt_counter (holds the integer number of times di/dt count has been incremented, specified in TABLE 1)

peak1 (holds the peak current of one half cycle ago)

peak2 (holds the peak current of two half cycles ago)

peak3 (holds the peak current of three half cycle ago)

peak4 (holds the peak current of four half cycle ago)

peak5 (holds the peak current of five half cycle ago)

high_current_arc_counter (holds the integer number of times an arcing half cycle was detected from TABLE 1)

high_frequency_counter (holds the integer number of counts of high frequency of the previous half cycles)

high_frequency_noise_counter (holds the integer number of high frequency counts during startup or steady state (currents less then 48A))

missing_half cycle (true when nonarcing half cycle follows arcing half cycle)

slow_rise (holds the value of peak1−di/dt1)

peak_ground_fault (holds the peak ground fault current of last half cycle)

The counters described above are incremented and cleared in the following way:

If (peak1>48A) then check the following:

If (di/dt1>(0.328×peak1) and high_frequency_counter>4 and high frequency noise counter<16))

increment di/dt_counter increment high_frequency counter increment high_current_arc_counter ElseIf (di/dt1>(0.328×peak1))

increment di/dt_counter increment high_current_arc_counter

ElseIf (di/dt1>(0.25×peak1) and high_frequency_counter>4 and high_frequency_noise_counter<16))

increment di/dt_counter increment high_frequency_counter increment high_current_arc_counter ElseIf (di/dt1>(0.203×peak1) and high frequency counter>4 and high frequency noise counter<16)

increment high_frequency_counter increment high_current_arc_counter

If no arcing half cycle in 0.5 seconds after last arcing half cycle, then clear all counters.

A line to neutral arc or ground fault arc is present under the following conditions of the above firmware counters:

If (ground fault>threshold)

If (peak currents>35A for 3 half cycles and missing_half cycle is true and di/dt_counter>1 and high_current_arc_counter>1)

If (peak currents>35A for 4 half cycles and missing_half cycle is true and high current_arc_counter>2)

If (peak currents>35A for 5 half cycles and missing_half cycle is true and high_current_arc_counter>3)

If (peak currents>35A for 5 half cycles and high current_arc_counter>3 and di/dt1>di/dt3 and di/dt_counter>2)

If (peak currents>35A for 5 half cycles and high_current_arc_counter>3 and di/dt1>di/dt3 and high_frequency_counter>2 and di/dt_counter>1)

If (peak currents>35A for >5 half cycles and <9 half cycles and high_current_arc_counter>3 and missing_half cycles is true)

If (peak currents>35A for >5 half cycles and <9 half cycles and high_current_arc_counter>3 and di/dt_counter>3)

If (peak currents>35A for >5 half cycles and <9 half cycles and high_current_arc_counter>3 and high_frequency_counter>1 and di/dt_counter>2)

If (peak currents>35A peak for >5 half cycles and <9 half cycles and high_current_arc_counter>3 and high_frequency_counter>2 and di/dt_counter>1)

If (high_current_arc>6)

Start-up Algorithms:

If (peak1 to peak4>35A and missing_half cycle=false) then check the following:

If (((peak1<(peak3−7A)) and (peak1<peak2)) and ((peak2<peak3) and (peak2<peak4−7A)))

tungsten lamp startup, clear the following counters
      high_current_arc_counter
      di/dt_counter
      high_frequency_counter ElseIf((peak3>peak1) and (peak5>peak3) and (di/dt1<peak1/2) and (di/dt2<peak2/2) and (di/dt3<peak3/2) and ((di/dt5+1.4A)>=di/dt3) and ((di/dt3+1.4A)>=di/dt1) and (slow_rise1>48A))

inductive load startup, clear the following counters
      di/dt_counter
      high_frequency_counter Note: The numerical values in the above expressions are selected for residential applications. However, specific numerical values, current levels and counter values are not limited to the above specifications, but may vary for other applications.

Variables could be substituted for the numerical values in the above expressions, for example "aA" could be substituted for "48A", "b" could be substituted for "0.328", "m" could be substituted for "4" and "c" could be substituted for "16" in the first three lines above under the statement, "The counters described above are incremented and cleared in the following way:" This scheme of substituting the letter variables for the specific numerical values given in the specific example above could be repeated in the same fashion throughout the above-listed algorithms. Accordingly, the above Table and algorithms could be restated as follows:

TABLE 1

(each row characterizes an arcing half cycle)

| peak current with aspect ratio | (di/dt) | high frequency broad band noise | high current arc counter | (di/dt) count | high frequency counter |
|---|---|---|---|---|---|
| >aA | >d × peak current | not required | increment | increment | unchanged |
| >aA | >d × peak current | present | increment | increment | increment |
| >aA | >h × peak current | required | increment | unchanged | increment |
| >aA | >e × peak current | required | increment | increment | increment | wherein:

aspect ratio is the peak divided by the area for one half cycle, area is the sum of the samples for one half cycle;

dt is the time between every other sample of the current waveform, this sample time varies dynamically with the line frequency to get better coverage of the current waveform; and high frequency broadband noise is the presence of broadband noise during a first number of half cycles on power-up of the module with a load connected and turned on, and normal operation due to noisy loads at steady state (currents below aA peak).

Counters are incremented and cleared as follows:

If (peak1>aA) then check the following:

If (di/dt1>(b×peak1) and high frequency counter>m and high frequency noise counter<c))
   increment di/dt counter
   increment high frequency counter
   increment high current arc counter ElseIf (di/dt1>(d×peak1))
   increment di/dt counter increment high current arc counter ElseIf (di/dt1>(e×peak1) and high frequency counter>f and high frequency noise counter<g))
   increment di/dt counter
   increment high frequency counter
   increment high current arc counter ElseIf (di/dt1>(h×peak1) and high frequency counter>k and high frequency noise counter<n))
   increment high frequency counter
   increment high current arc counter wherein:

di/dt1 holds the maximum di/dt one half cycle ago di/dt counter holds the integer number of times di/dt count has been incremented (see TABLE 1)

peak1 holds the peak current of one half cycle ago high current arc counter holds the integer number of times an arcing half cycle was detected (see TABLE 1)

high frequency counter holds the integer number of counts of high frequency of the previous half cycles high frequency noise counter holds the integer number of high frequency counts during startup or steady state (currents less than aA), and wherein a, b, c, d, e, f, g, h, k, m and n are numerical values.

A line to neutral arc fault or a ground fault arc is present in accordance under the following conditions:

If (ground fault>threshold)

If (peak currents>pA for q half cycles and missing half cycle is true and di/dt counter>1 and high current arc counter>1)

If (peak currents>pA for s half cycles and missing half cycle is true and high current arc counter>2)

If (peak currents>pA for t half cycles and missing half cycle is true and high current arc counter>3)

If (peak currents>pA for t half cycles and high current arc counter>3 and di/dt1>di/dt3 and di/dt counter>2)

If (peak currents>pA for t half cycles and high current arc counter>3 and di/dt1>di/dt3 and high frequency counter>2 and di/dt counter>1)

If (peak currents>pA for >t half cycles and <u half cycles and high current arc counter>3 and missing half cycles is true)

If (peak currents>pA for >t half cycles and <u half cycles and high current arc counter>3 and di/dt counter>3)

If (peak currents>pA for >t half cycles and <u half cycles and high current arc counter>3 and high frequency counter>1 and di/dt counter>2)

If (peak currents>pA peak for >t half cycles and <u half cycles and high current arc counter>3 and high frequency counter>2 and di/dt counter>1)

If (high current arc>6);
and using the following start-up algorithms:
If (peak1 to peak4>pA and missing half cycle=false) then check the following:
  If (((peak1<(peak3−vA)) and peak1<peak2)) and ((peak2<peak3) and (peak2<peak4−vA)))
    for a tungsten lamp startup, clear the following counters
      high current arc counter
      di/dt counter
      high frequency counter
  ElseIf((peak3>peak1) and (peak5>peak3) and (di/dt1<peak1/2) and (di/dt2<peak2/2) and (di/dt3<peak3/2) and ((di/dt5+wA)>=di/dt3) and ((di/dt3 +wA)>=di/dt1) and (slow rise1>aA))
    for an inductive load startup, clear the following counters
      di/dt counter
      high frequency counter;
wherein:
  di/dt2 holds the maximum di/dt two half cycles ago
  di/dt3 holds the maximum di/dt three half cycles ago
  di/dt4 holds the maximum di/dt four half cycles ago
  peak2 holds the peak current of two half cycle ago
  peak3 holds the peak current of three half cycle ago
  peak4 holds the peak current of four half cycle ago
  peak5 holds the peak current of five half cycle ago
  missing half cycle true when nonarcing follows arcing half cycle
  slow rise holds the value of peak1−di/dt1
  peak ground fault holds the peak ground fault current of last half cycle;
and
  wherein p, q, r, s, t, u, v and w are numerical values and u>t>s>q.

Figure 2:
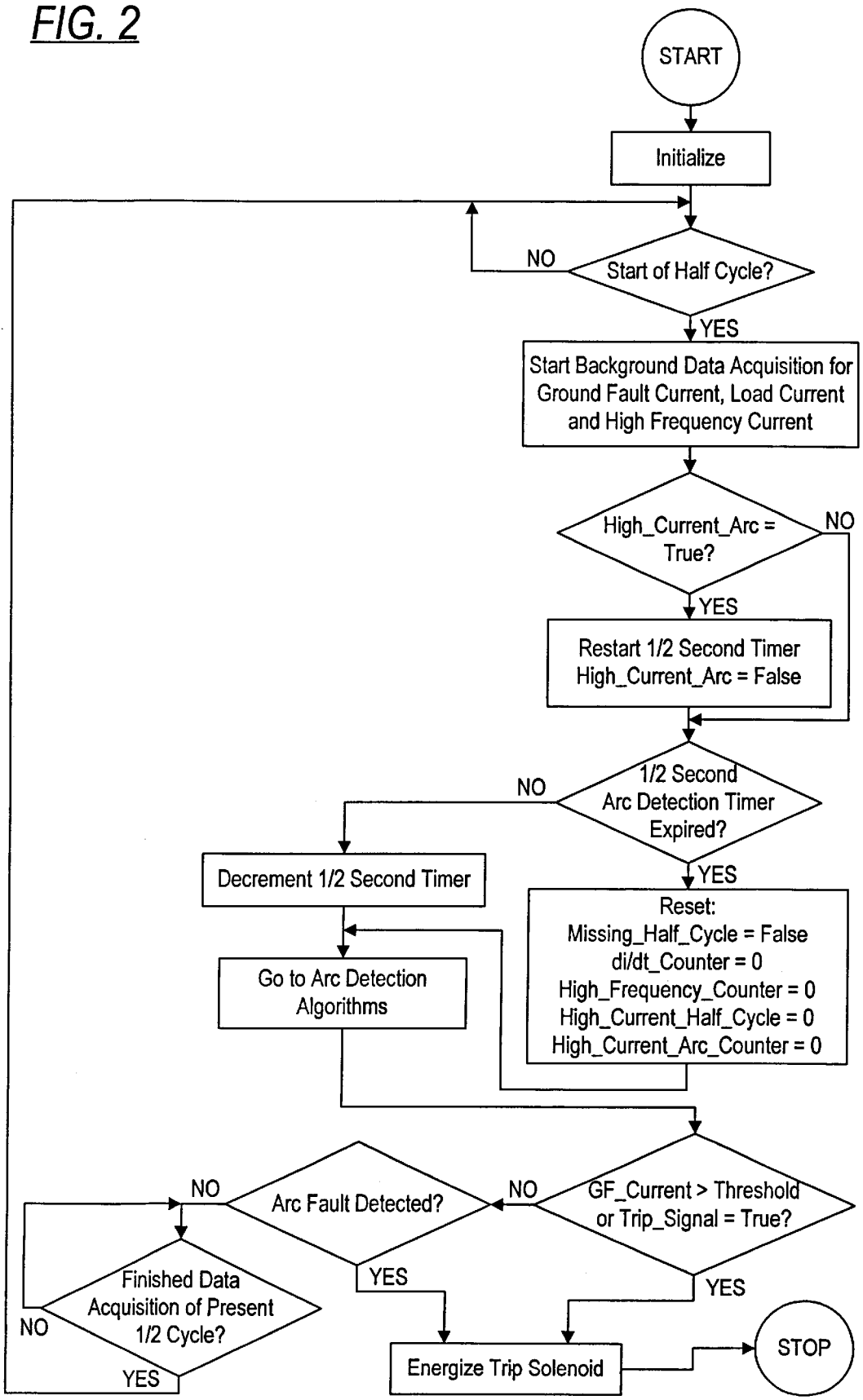
FIGS. 2–7 are flow charts illustrating the operation of the invention.
Figure 3:
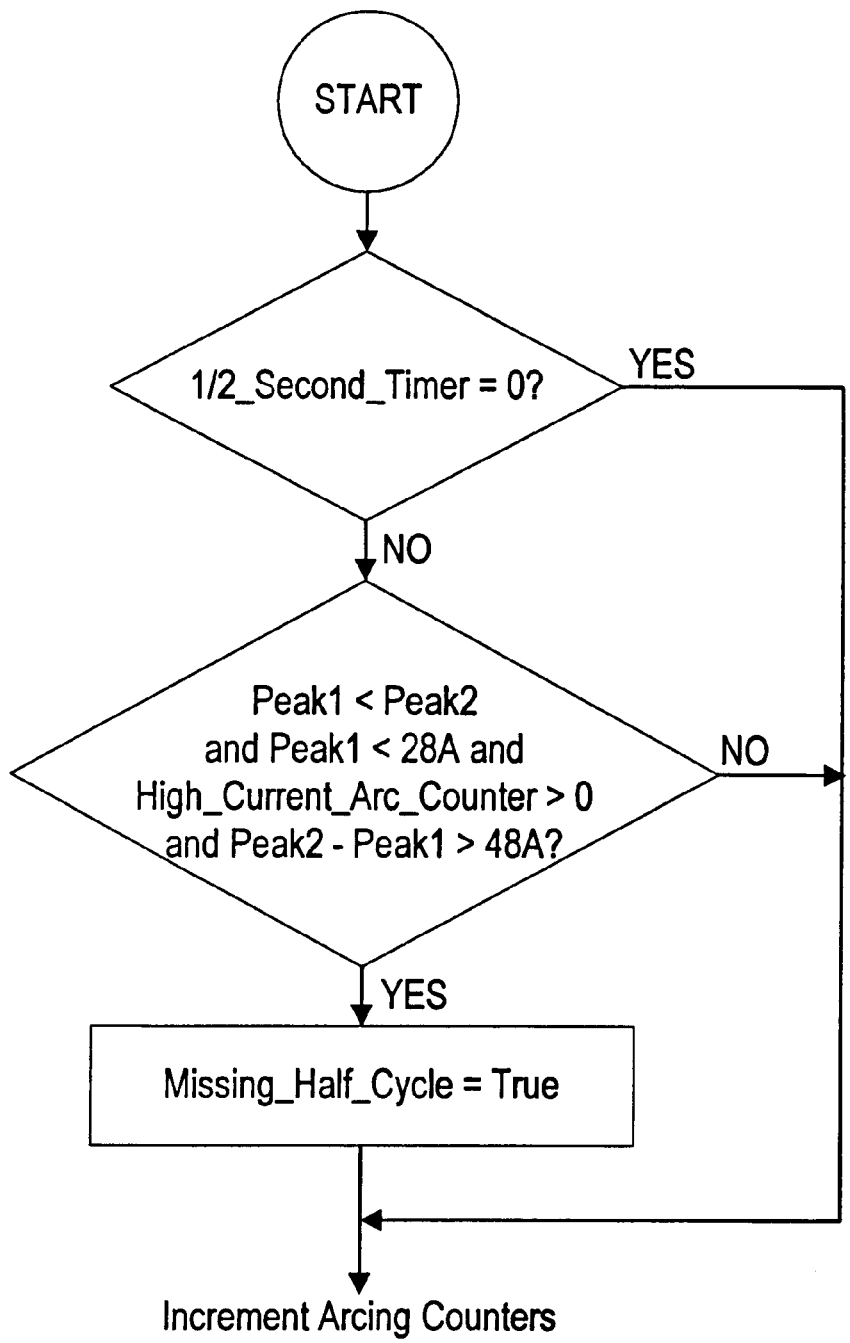
Figure 4:
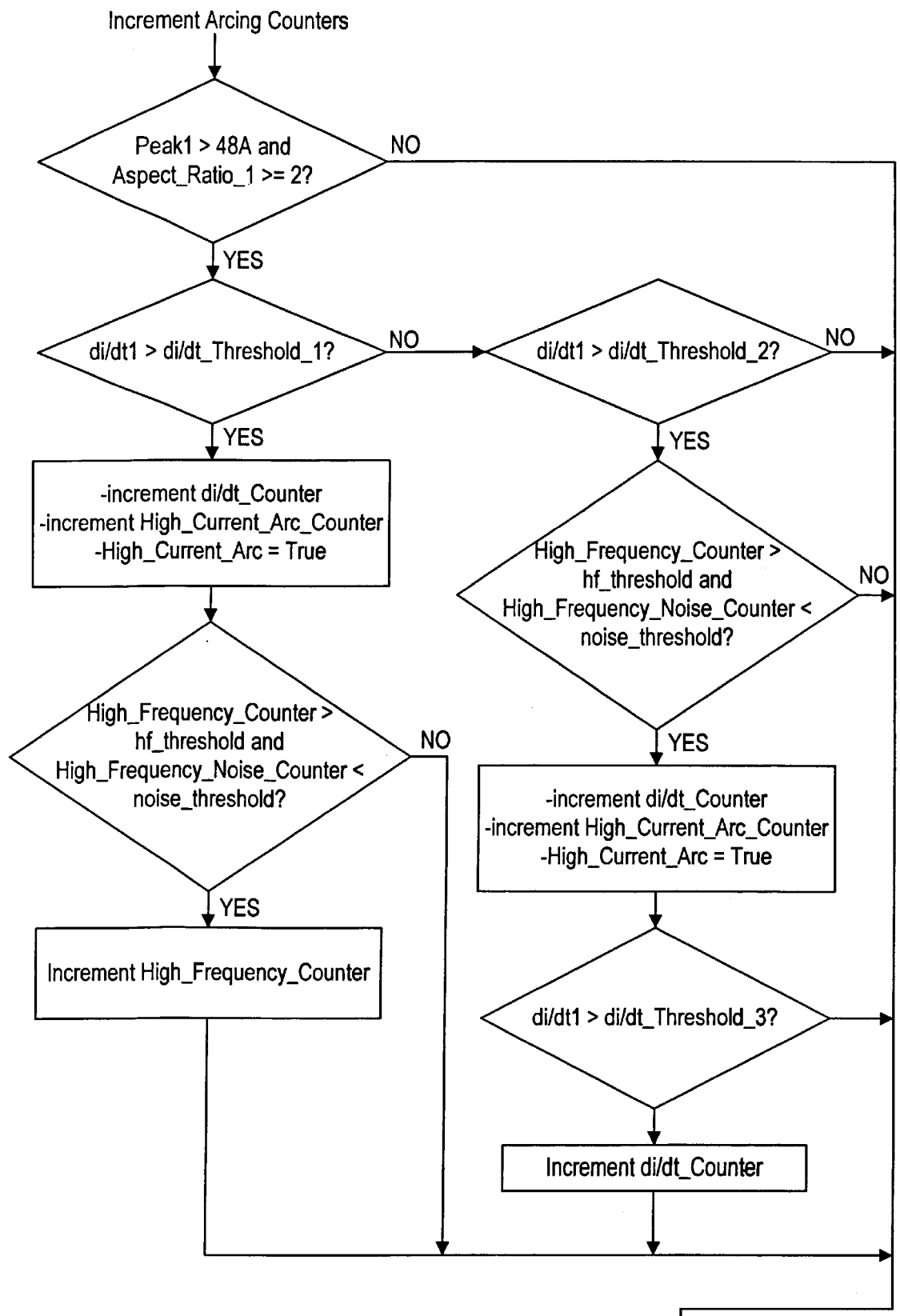
Figure 5:
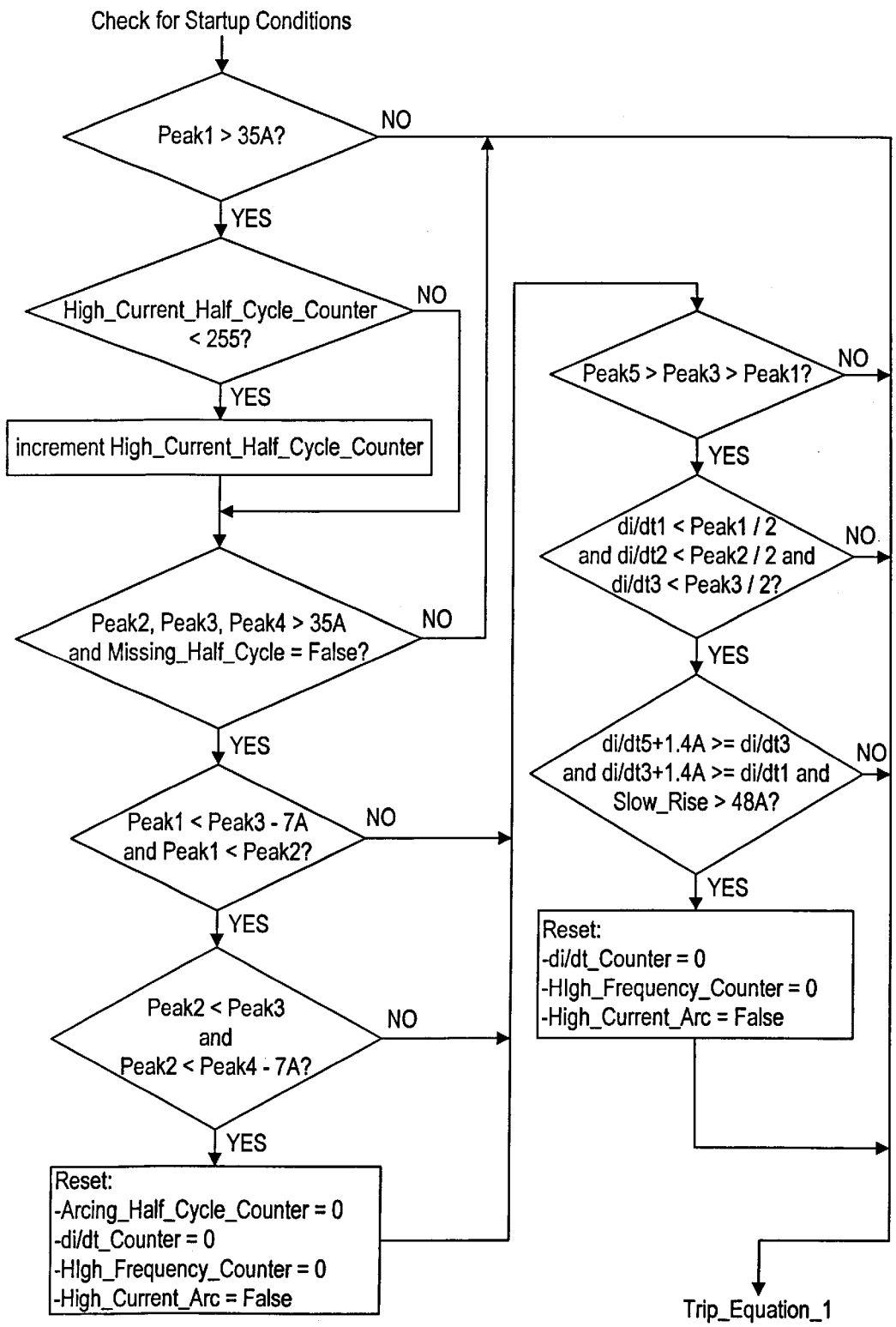
Figure 6:
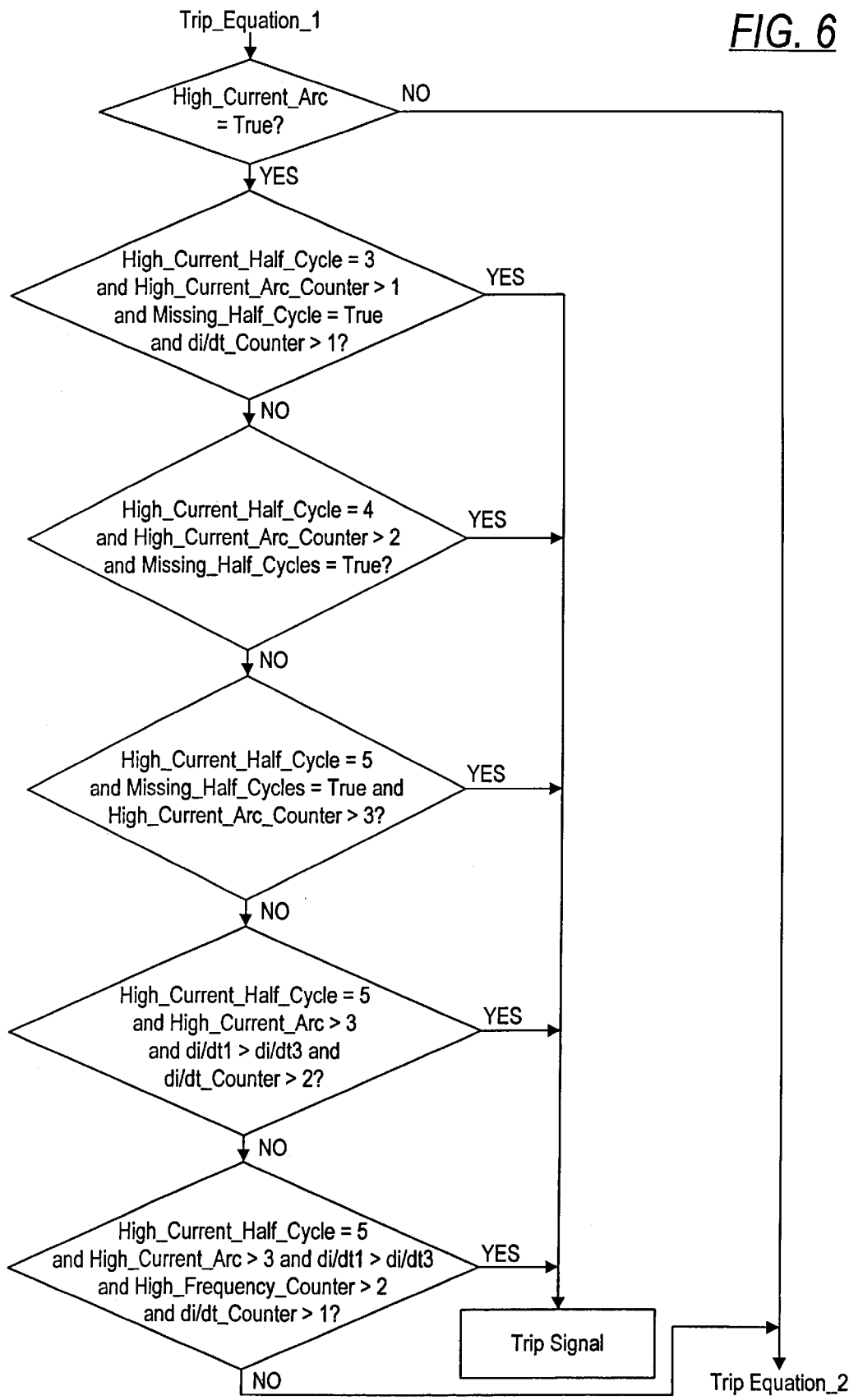
Figure 7:
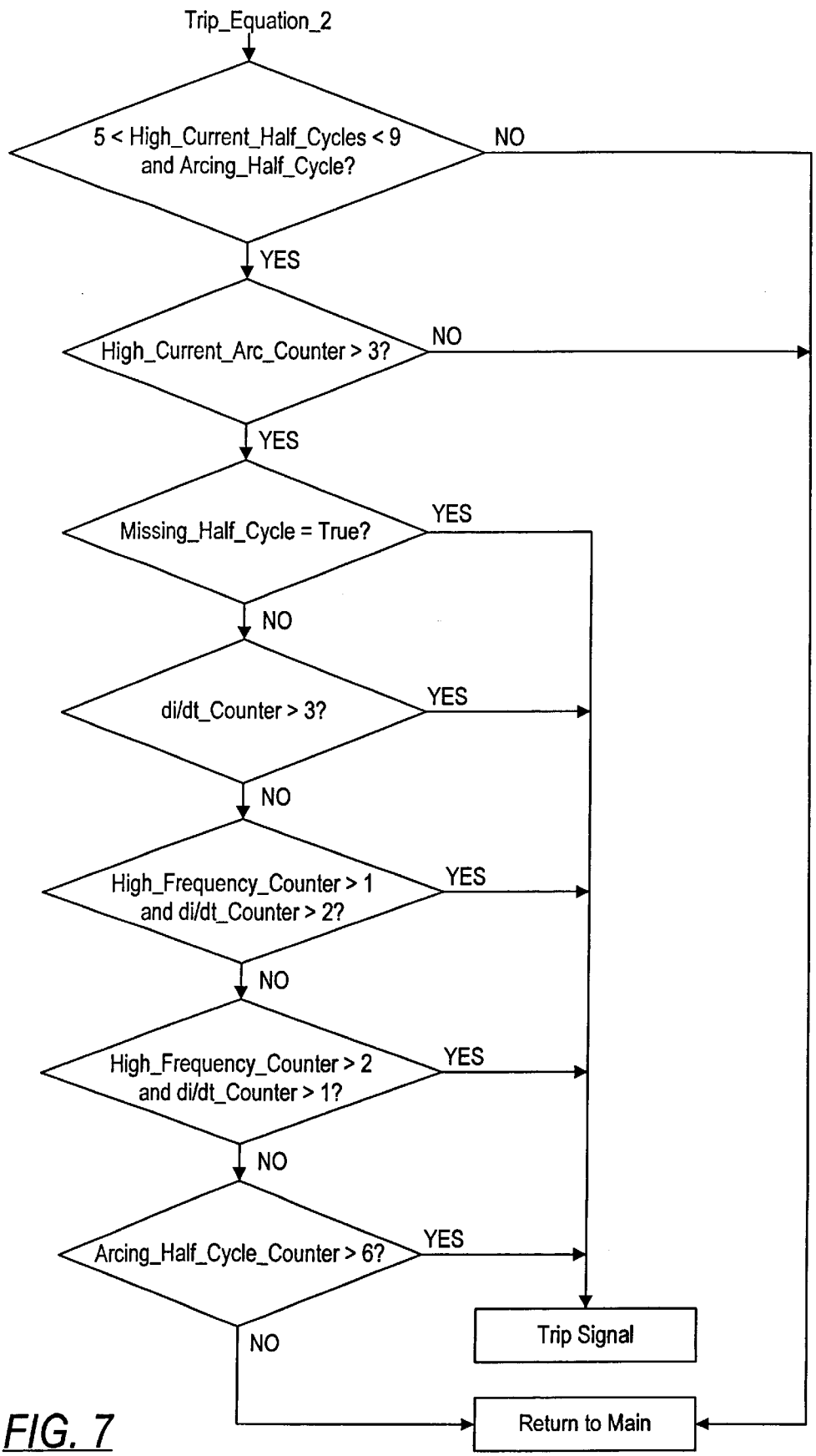

FIGS. 2–7 are flowcharts which illustrate the above-described operation of the invention and the flow of the above-described algorithm. FIG. 7 illustrates the main program or operating sequence. FIGS. 2–6 illustrate the "type B algorithms" referred to in FIG. 7. In FIG. 2, a one half second timer is implemented as described above "if no arcing half cycle in 0.5 seconds after last arcing half cycle, then clear all counters." The algorithms of FIGS. 3–6 are implemented as described above; however, the order of operation of the illustrated embodiment is as indicated in FIGS. 3–6. For example, the conditions under which counters are incremented and cleared is shown in FIGS. 3 and 4 and the manner in which trip equations are carried out to determine whether a line to neutral arc or ground fault is present is shown, in FIGS. 5 and 6.

Figure 8:
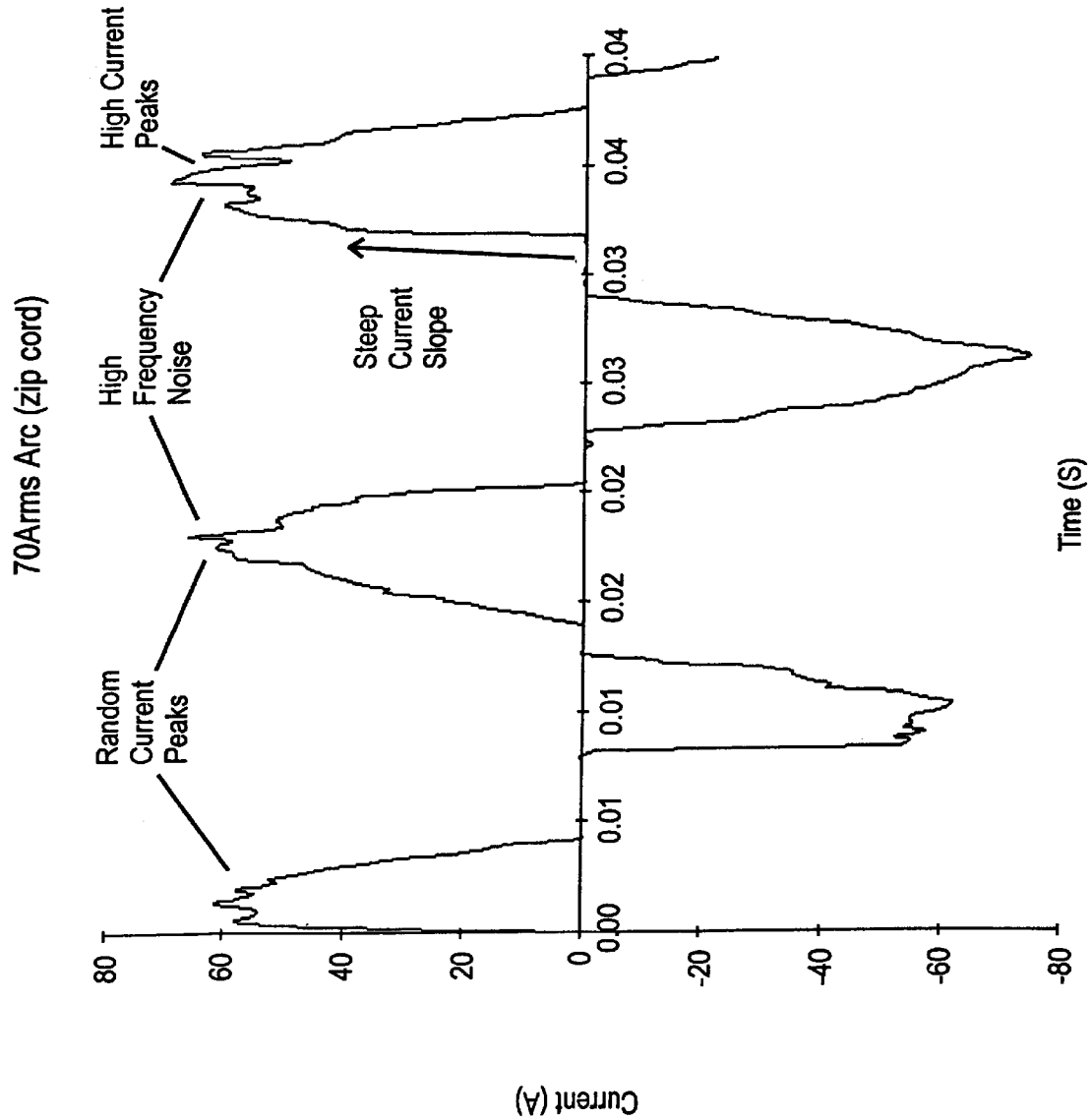
FIGS. 8–10 are current waveforms illustrating aspects of the operation of the invention.
Figure 9:
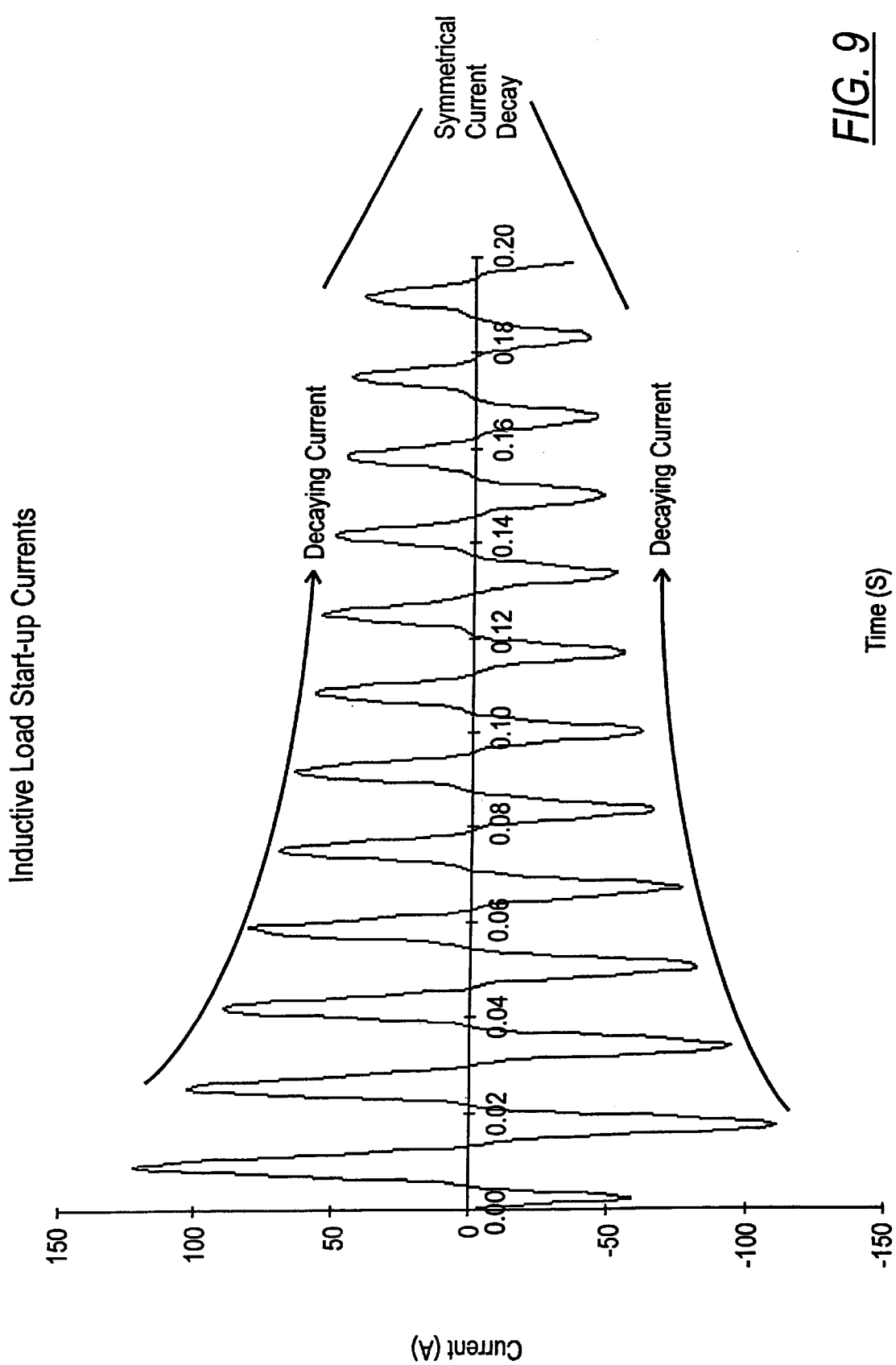
Figure 10:
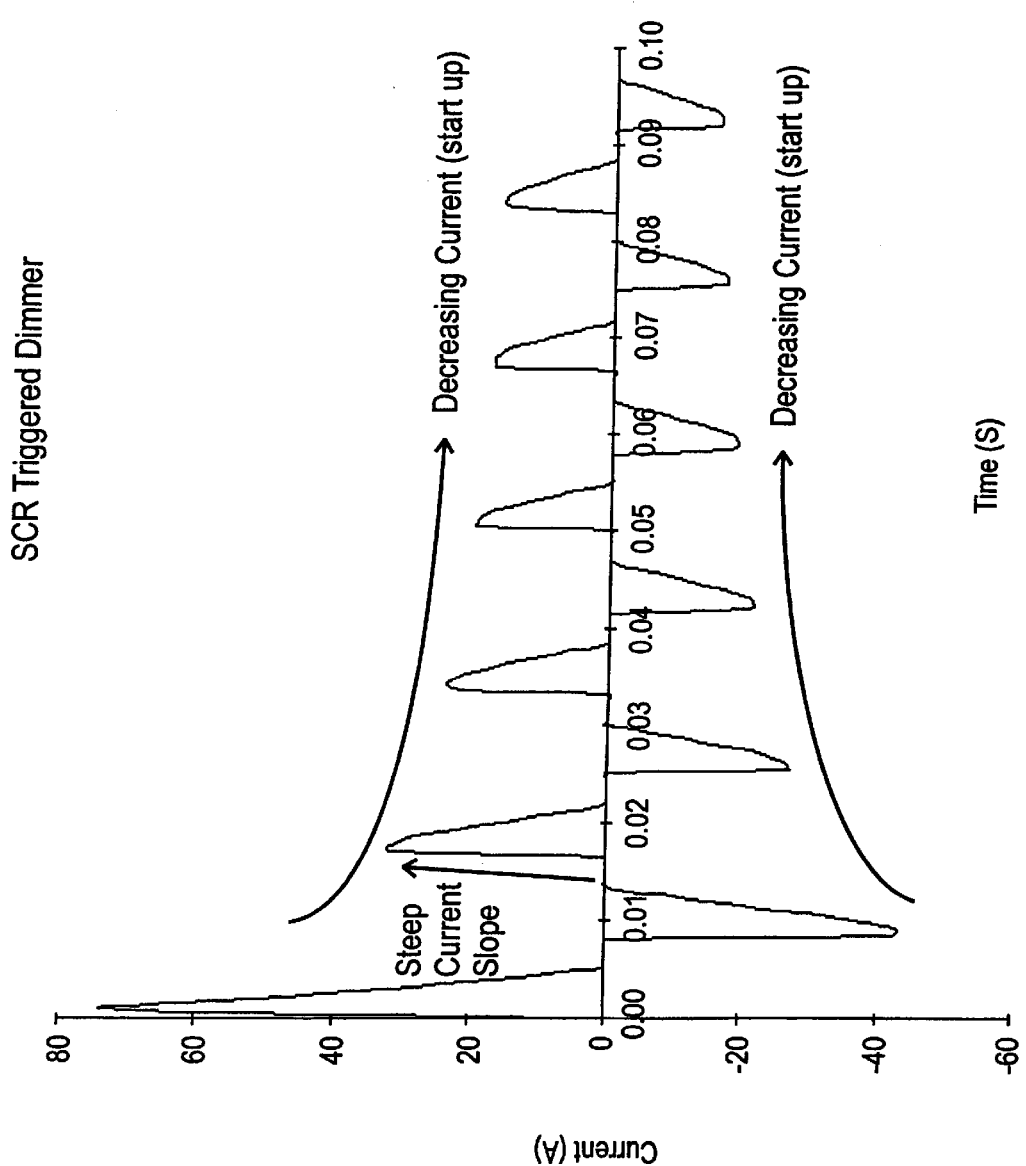

FIGS. 8–10 are current wave forms that describe the characteristics of a high current arc (FIG. 8) and of two types of typical load startup currents (FIG. 9 and FIG. 10). More particularly, FIG. 8 shows a waveform typical of a 70 amp RMS arc in a zip cord or lamp cord. FIG. 9 shows typical waveforms of start-up currents in an inductive load, while FIG. 10 shows a typical current waveform for an SCR-triggered lamp dimmer.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of determining whether arcing is present in an electrical circuit comprising:
   sensing current in said circuit and developing a corresponding first signal;
   analyzing said first signal to determine the presence of broadband noise in a predetermined range of frequencies, and producing a corresponding second signal; and
   processing said first signal and said second signal to determine current peaks, and to determine, using said current peaks and the presence of broadband noise, whether an arcing fault is present in said circuit by comparing data corresponding to said current peaks and broadband noise with preselected data indicative of an arcing fault.

2. The method of claim 1 and further including producing a trip signal in response to a determination that an arcing fault is present in said circuit.

3. The method of claim 1 wherein said processing comprises incrementing a plurality of counters in response to said current peaks and the broadband noise determined to be present in said circuit, and periodically determining whether an arcing fault is present by monitoring said plurality of counters and comparing counts in said counters with one or more preselected counts indicative of an arcing fault.

4. The method of claim 3 wherein developing said first signal includes developing a di/dt signal corresponding to a change in current over time; wherein said counters are implemented in software and include a di/dt counter, a high frequency counter and a high current arc counter; and
   wherein:
      di/dt counter holds the integer number of times a di/dt count has been incremented in response to said di/dt signal,
      high current arc counter holds the integer number of times an arcing half cycle was detected, and
      high frequency counter holds the integer number of counts of high frequency of the previous half cycles.

5. The method of claim 4 wherein said sensing current comprises taking a plurality of current samples per cycle of an alternating current, and wherein said incrementing said counters comprises incrementing said counters in accordance with the following:
   If (peak1>aA) then check the following:

```
If (di/dt1>(b×peak1) and high frequency counter>m
    and high frequency noise counter<c))
    increment di/dt counter
    increment high frequency counter
    increment high current arc counter
ElseIf (di/dt1>(d×peak1))
    increment di/dt counter
    increment high current arc counter
ElseIf (di/dt1>(e×peak1) and high frequency counter>f
    and high frequency noise counter<g))
    increment di/dt counter
    increment high frequency counter
    increment high current arc counter
ElseIf (di/dt1>(h×peak1) and high frequency counter>k
    and high frequency noise counter<n))
    increment high frequency counter
    increment high current arc counter
``` wherein:

a di/dt1 counter holds the maximum di/dt one half cycle ago a peak1 counter holds a peak current of one half cycle ago a high frequency noise counter holds the integer number of high frequency counts during startup or steady state (currents less than aA), and wherein a, b, c, d, e, f, g, h, k, m and n are variable numerical values, and A represents current in amperes.

6. The method of claim 5 wherein the integer number of times di/dt count has been incremented and the integer number of times an arcing half cycle has been detected are specified as follows:
(each row characterizes an arcing half cycle)

| peak current with aspect ratio | (di/dt) | high frequency broad band noise | high current arc counter | (di/dt) counter | high frequency counter |
|---|---|---|---|---|---|
| >aA | >d × peak current | not required | increment | increment | unchanged |
| >aA | >d × peak current | present | increment | increment | increment |
| >aA | >h × peak current | required | increment | unchanged | increment |
| >aA | >e × peak current | required | increment | increment | increment | wherein:

aspect ratio is the peak current divided by the area for one half cycle, area is the sum of the samples for one half cycle;

dt is the time between every other sample of the current waveform, which sample time varies dynamically with the alternating current frequency to get better coverage of a current waveform; and high frequency broadband noise is the presence of broadband noise during a first number of half cycles on power-up with a load connected and turned on, and during normal operation due to noisy loads at steady state (currents below a peak value of aA).

7. The method of claim 5 wherein if no arcing half cycle is detected in a predetermined amount of time after the last arcing half cycle, then all counters are cleared.

8. The method of claim 5 and further including determining whether a line to neutral arc fault or a ground fault arc is present in accordance with the following:

If (peak ground fault>a threshold value)

If (peak current>pA for q half cycles and missing half cycle is true and di/dt counter>1 and high current arc counter>1)

If (peak current>pA for s half cycles and missing half cycle is true and high current arc counter>2)

If (peak current>pA for t half cycles and missing half cycle is true and high current arc counter>3)

If (peak current>pA for t half cycles and high current arc counter>3 and di/dt1>di/dt3 and di/dt counter>2)

If (peak current>pA for t half cycles and high current arc counter>3 and di/dt1>di/dt3 and high frequency counter>2 and di/dt counter>1)

If (peak current>pA for >t half cycles and <u half cycles and high current arc counter>3 and missing half cycles is true)

If (peak current>pA for >t half cycles and <u half cycles and high current arc counter >3 and di/dt counter>3)

If (peak current>pA for >t half cycles and <u half cycles and high current arc counter>3 and high frequency counter>1 and di/dt counter>2)

If (peak current>pA for >t half cycles and <u half cycles and high current arc counter>3 and high frequency counter>2 and di/dt counter>1)

If (high current arc>6);

and using the following start-up algorithms:

If (peak1 to peak4>pA and missing half cycle=false) then check the following:

If (((peak1<(peak3−vA)) and peak1<peak2)) and ((peak2<peak3) and (peak2<peak4−vA)))
    for a tungsten lamp startup, clear the following counters
        high current arc counter
        di/dt counter
        high frequency counter ElseIf((peak3>peak1) and (peak5>peak3) and (di/dt1<peak1/2) and (di/dt2<peak2/2) and (di/dt3<peak3/2) and ((di/dt5+wA)>=di/dt3) and ((di/dt3+wA)>=di/dt1) and (slow rise1>aA))
    for an inductive load startup, clear the following counters
        di/dt counter
        high frequency counter;

wherein:
high current arc is a count in the high current arc counter a di/dt2 counter holds the maximum di/dt two half cycles ago a di/dt3 counter holds the maximum di/dt three half cycles ago a di/dt4 counter holds the maximum di/dt four half cycles ago a di/dt5 counter holds the maximum di/dt five half cycles ago a peak2 counter holds the peak current of two half cycles ago a peak3 counter holds the peak current of three half cycles ago a peak4 counter holds the peak current of four half cycles ago a peak5 counter holds the peak current of five half cycles ago a missing half cycle is true when a nonarcing half cycle follows an arcing half cycle a slow rise1 counter holds the value of peak1−di/dt1 a peak ground fault counter holds a peak ground fault current of the last half cycle; and wherein p, q, s, t, u, v and w are variable numerical values and u>t>s>q.

9. A system for determining whether arcing is present in an electrical circuit comprising:

a sensor for sensing current in said circuit and developing a corresponding sensor signal;

a circuit for analyzing said sensor signal to determine the presence of broadband noise in a predetermined range of frequencies, and producing a corresponding output signal; and a controller for processing said sensor signal and said output signal to determine current peaks and to determine, using said current peaks and the presence of broadband noise, whether an arcing fault is present in said circuit, by comparing data corresponding to said current peaks and broadband noise with preselected data indicative of an arcing fault.

10. The system of claim 9 wherein the controller produces a trip signal in response to a determination that an arcing fault is present in said circuit.

11. The system of claim 9 wherein the controller includes a plurality of counters and increments said plurality of counters in response to said sensor signal and said output signal, and periodically determines whether an arcing fault is present by monitoring said plurality of counters and comparing counts in said counters with one or more preselected counts indicative of an arcing fault.

12. The system of claim 11 wherein said sensor develops a di/dt signal corresponding to a change in current over time, wherein said counters are implemented in software and include a di/dt counter, a high frequency counter and a high current arc counter;

wherein:

di/dt counter holds the integer number of times a di/dt count has been incremented in response to said di/dt signal, high current arc counter holds the integer number of times an arcing half cycle was detected, and high frequency counter holds the integer number of counts of high frequency of the previous half cycles.

13. The system of claim 12 wherein the controller takes a plurality of current samples per cycle of an alternating current and increments said counters in accordance with the following:

If (peak1>aA) then check the following:
  If (di/dt1>(b×peak1 and high frequency counter>m and high frequency noise counter<c))
    increment di/dt counter
    increment high frequency counter
    increment high current arc counter
  ElseIf (di/dt1>(d×peak1))
    increment di/dt counter
    increment high current arc counter
  ElseIf (di/dt1>(e×peak1) and high frequency counter>f and high frequency noise counter<g))
    increment di/dt counter
    increment high frequency counter
    increment high current arc counter
  ElseIf (di/dt1>(h×peak1) and high frequency counter>k and high frequency noise counter<n))
    increment high frequency counter
    increment high current arc counter wherein:

a di/dt1 counter holds the maximum di/dt one half cycle ago a peak1 counter holds a peak current of one half cycle ago a high frequency noise counter holds the integer number of high frequency counts during startup or steady state (currents less than aA), and wherein a, b, c, d, e, f, g, h, k, m and n are variable numerical values, and A represents current in amperes.

14. The system of claim 13 wherein the integer number of times di/dt count has been incremented and the integer number of times an arcing half cycle has been detected are specified as follows:
(each row characterizes an arcing half cycle)

| peak current with aspect ratio | (di/dt) | high frequency broad band noise | high current arc counter | (di/dt) counter | high frequency counter |
|---|---|---|---|---|---|
| >aA | >d × peak current | not required | increment | increment | unchanged |
| >aA | >d × peak current | present | increment | increment | increment |
| >aA | >h × peak current | required | increment | unchanged | increment |
| >aA | >e × peak current | required | increment | increment | increment | wherein:

aspect ratio is the peak current divided by the area for one half cycle, area is the sum of the samples for one half cycle;

dt is the time between every other sample of the current waveform, which sample time varies dynamically with the alternating current frequency to get better coverage of a current waveform; and high frequency broadband noise is the presence of broadband noise during a first number of half cycles on power-up with a load connected and turned on, and during normal operation due to noisy loads at steady state (currents below a peak value of aA).

15. The system of claim 13 wherein if no arcing half cycle is detected in a predetermined amount of time after the last arcing half cycle, then all counters are cleared by the controller.

16. The system of claim 13 wherein the controller determines whether a line to neutral arc fault or a ground fault arc is present in accordance with the following:

If (peak ground fault>a threshold value)
If (peak current>pA for q half cycles and missing half cycle is true and di/dt counter>1 and high current arc counter>1)
If (peak current>pA for s half cycles and missing half cycle is true and high current arc counter>2)
If (peak current>pA for t half cycles and missing half cycle is true and high current arc counter>3)
If (peak current>pA for t half cycles and high current arc counter>3 and di/dt1>di/dt3 and di/dt counter>2)
If (peak current>pA for t half cycles and high current arc counter>3 and di/dt1>di/dt3 and high frequency counter>2 and di/dt counter>1)
If (peak current>pA for >t half cycles and <u half cycles and high current arc counter>3 and missing half cycles is true)

If (peak current>pA for >t half cycles and <u half cycles and high current arc counter >3 and di/dt counter>3)

If (peak current>pA for >t half cycles and <u half cycles and high current arc counter>3 and high frequency counter>1 and di/dt counter>2)

If (peak current>pA for >t half cycles and <u half cycles and high current arc counter>3 and high frequency counter>2 and di/dt counter>1)

If (high current arc>6);

and using the following start-up algorithms:

If (peak1 to peak4>pA and missing half cycle=false) then check the following:

If (((peak1<(peak3−vA)) and peak1<peak2)) and ((peak2<peak3) and (peak2<peak4−vA)))
   for a tungsten lamp startup, clear the following counters
   high current arc counter
   di/dt counter
   high frequency counter ElseIf((peak3>peak1) and (peak5>peak3) and (di/dt1<peak1/2) and (di/dt2<peak2/2) and (di/dt3<peak3/2) and ((di/dt5+wA)>=di/dt3) and ((di/dt3+wA)>=di/dt1) and (slow rise1>aA))
   for an inductive load startup, clear the following counters
   di/dt counter
   high frequency counter;

wherein:
   high current arc is a count in the high current arc counter
   a di/dt2 counter holds the maximum di/dt two half cycles ago
   a di/dt3 counter holds the maximum di/dt three half cycles ago
   a di/dt4 counter holds the maximum di/dt four half cycles ago
   a di/dt5 counter holds the maximum di/dt five half cycles ago
   a peak2 counter holds the peak current of two half cycles ago
   a peak3 counter holds the peak current of three half cycles ago
   a peak4 counter holds the peak current of four half cycles ago
   a peak5 counter holds the peak current of five half cycles ago
   a missing half cycle is true when a nonarcing half cycle follows an arcing half cycle
   a slow rise1 counter holds the value of peak1−di/dt1
   a peak ground fault counter holds a peak ground fault current of the last half cycle; and wherein p, q, s, t, u, v and w are variable numerical values and u>t>s>q.

17. A controller for a system for determining whether arcing is present in an electrical circuit in response to input signals, said input signals corresponding to a changing current in said circuit and to the presence of broadband noise in at least one predetermined range of frequencies in said circuit, said controller comprising:
   a plurality of counters;
   means for incrementing said plurality of counters in response to said input signals corresponding to a changing current and to said input signals corresponding to the presence of broadband noise; and
   means for periodically determining whether an arcing fault is present by monitoring said plurality of counters and comparing counts in said counters with one or more preselected counts indicative of an arcing fault.

18. The controller of claim 17 wherein the controller further produces a trip signal in response to a determination that an arcing fault is present in said circuit.

19. The controller of claim 17 wherein said input signals corresponding to a changing current include a di/dt signal corresponding to a change in current over time, wherein said counters are implemented in software and include a di/dt counter, a high frequency counter and a high current arc counter; and
   wherein:
      di/dt counter holds the integer number of times a di/dt count has been incremented in response to said di/dt signal
      high current arc counter holds the integer number of times an arcing half cycle was detected, and
      high frequency counter holds the integer number of counts of high frequency of the previous half cycles.

20. The controller of claim 17 wherein the controller takes a plurality of current samples per cycle of an alternating current and increments said counters in accordance with the following:
   If (peak1>aA) then check the following:
      If (di/dt1>(b×peak1) and high frequency counter>m and high frequency noise counter<c))
         increment di/dt counter
         increment high frequency counter
         increment high current arc counter
      ElseIf (di/dt1>(d×peak1))
         increment di/dt counter
         increment high current arc counter
      ElseIf (di/dt1>(e×peaks) and high frequency counter>f and high frequency noise counter<g))
         increment di/dt counter
         increment high frequency counter
         increment high current arc counter
      ElseIf (di/dt1>(h×peak1) and high frequency counter>k and high frequency noise counter<n))
         increment high frequency counter
         increment high current arc counter
   wherein:
      a di/dt1 counter holds the maximum di/dt one half cycle ago
      a peak1 counter holds a peak current of one half cycle ago
      a high frequency noise counter holds the integer number of high frequency counts during startup or steady state (currents less than 48A), and
   wherein a, b, c, d, e, f, g, h, k, m and n are variable numerical values, and A represents current in amperes.

21. The controller of claim 20 wherein the integer number of times di/dt count has been incremented and the integer number of times an arcing half cycle has been detected are specified as follows:

each row characterizes an arcing half cycle)

| peak current with aspect ratio | (di/dt) | high frequency broad band noise | high current arc counter | (di/dt) counter | high frequency counter |
|---|---|---|---|---|---|
| >aA | >d × peak current | not required | increment | increment | unchanged |

-continued

| peak current with aspect ratio | (di/dt) | high frequency broad band noise | high current arc counter | (di/dt) counter | high frequency counter |
|---|---|---|---|---|---|
| >aA | >d × peak current | present | increment | increment | increment |
| >aA | >h × peak current | required | increment | unchanged | increment |
| >aA | >e × peak current | required | increment | increment | increment | wherein:
aspect ratio is the peak current divided by the area for one half cycle, area is the sum of the samples for one half cycle;
dt is the time between every other sample of the current waveform, which sample time varies dynamically with the alternating current frequency to get better coverage of a current waveform; and
high frequency broadband noise is the presence of broadband noise during a first number of half cycles on power-up with a load connected and turned on, and during normal operation due to noisy loads at steady state (currents below a peak value of aA).

22. The controller of claim 20 wherein if no arcing half cycle is detected in a predetermined amount of time after the last arcing half cycle, then all counters are cleared.

23. The controller of claim 20 wherein the controller further determines whether a line to neutral arc fault or a ground fault arc is present in accordance with the following:

If (peak ground fault>a threshold value)
  If (peak current>pA for q half cycles and missing half cycle is true and di/dt counter>1 and high current arc counter>1)
  If (peak current>pA for s half cycles and missing half cycle is true and high current arc counter>2)
  If (peak current>pA for t half cycles and missing half cycle is true and high current arc counter>3)
  If (peak current>pA for t half cycles and high current arc counter>3 and di/dt1>di/dt3 and di/dt counter>2)
  If (peak current>pA for t half cycles and high current arc counter>3 and di/dt1>di/dt3 and high frequency counter>2 and di/dt counter>1)
  If (peak current>pA for >t half cycles and <u half cycles and high current arc counter>3 and missing half cycles is true)
  If (peak current>pA for >t half cycles and <u half cycles and high current arc counter >3 and di/dt counter>3)
  If (peak current>pA for >t half cycles and <u half cycles and high current arc counter>3 and high frequency counter>1 and di/dt counter>2)
  If (peak current>pA for >t half cycles and <u half cycles and high current arc counter>3 and high frequency counter>2 and di/dt counter>1)
If (high current arc>6)
Start-up Algorithms:
If (peak1 to peak4>pA and missing half cycle=false) then check the following:
  If (((peak1<(peak3<vA)) and peak1<peak2)) and ((peak2<peak3) and (peak2<peak4−vA)))
    tungsten lamp startup, clear the following counters
    high current arc counter
    di/dt counter
    high frequency counter
  ElseIf((peak3>peak1) and (peak5>peak3) and (di/dt1<peak1/2) and (di/dt2<peak2/2) and (di/dt3<peak3/2) and ((di/dt5+wA)>=di/dt3) and ((di/dt3+wA)>=di/dt1) and (slow rise1>aA))
    inductive load startup, clear the following counters
    di/dt counter
    high frequency counter;
wherein:
  high current arc is a count in the high current arc counter
  a di/dt2 counter holds the maximum di/dt two half cycles ago
  a di/dt3 counter holds the maximum di/dt three half cycles ago
  a di/dt4 counter holds the maximum di/dt four half cycles ago
  a di/dt5 counter holds the maximum di/dt five half cycles ago
  a peak2 counter holds the peak current of two half cycles ago
  a peak3 counter holds the peak current of three half cycles ago
  a peak4 counter holds the peak current of four half cycles ago
  a peak5 counter holds the peak current of five half cycles ago
  a missing half cycle is true when a nonarcing half cycle follows an arcing half cycle
  a slow rise1 counter holds the value of peak1−di/dt1
  a peak ground fault counter holds a peak ground fault current of the last half cycle; and
wherein p, q, s, t, u, v and w are variable numerical values and u>t>s>q.

24. A method of determining whether arcing is present in an electrical circuit in response to input signals, said input signals corresponding to a changing current in said circuit and to the presence of broadband noise in at least one predetermined range of frequencies in said circuit, said method comprising the steps of:
  incrementing a plurality of counters in response to said input signals corresponding to a changing current and to said input signals corresponding to the presence of broadband noise; and
  periodically determining whether an arcing fault is present by monitoring said plurality of counters and comparing counts in said counters with one or more preselected counts indicative of an arcing fault.

25. The method of claim 24 wherein said input signals corresponding to a changing current include a di/dt signal corresponding to a change in current over time, wherein said counters are implemented in software and include a di/dt counter, a high frequency counter and a high current arc counter; and
wherein:
  di/dt counter holds the integer number of times a di/dt count has been incremented in response to said di/dt signal
  high current arc counter holds the integer number of times an arcing half cycle was detected, and
  high frequency counter holds the integer number of counts of high frequency of the previous half cycles.

26. The method of claim 24 and further including the step of producing a trip signal in response to a determination that an arcing fault is present in said circuit.

27. The method of claim 24 wherein the input signals include a plurality of samples per cycle of an alternating current, wherein said counters include a di/dt counter, a high frequency counter and a high current arc counter and wherein the step of incrementing said counters comprises incrementing counters in accordance with the following:

If (peak1>aA) then check the following:
    If (di/dt1>(b×peak1) and high frequency counter>m and high frequency noise counter<c))
        increment di/dt counter
        increment high frequency counter
        increment high current arc counter
    ElseIf (di/dt1>(d×peak1))
        increment di/dt counter
        increment high current arc counter
    ElseIf (di/dt1>(e×peak1) and high frequency counter>f and high frequency noise counter<g))
        increment di/dt counter
        increment high frequency counter
        increment high current arc counter
    ElseIf (di/dt1>(h×peak1) and high frequency counter>k and high frequency noise counter<n))
        increment high frequency counter
        increment high current arc counter
wherein:
    a di/dt1 counter holds the maximum di/dt one half cycle ago
    a peak1 counter holds a peak current of one half cycle ago
    a high frequency noise counter holds the integer number of high frequency counts during startup or steady state (currents less than aA), and
wherein a, b, c, d, e, f, g, h, k, m and n are variable numerical values, and A represents current in amperes.

28. The method of claim 27 wherein the integer number of times the di/dt counter has been incremented and the integer number of times an arcing half cycle has been detected are specified as follows:
(each row characterizes an arcing half cycle)

| peak current with aspect ratio | (di/dt) | high frequency broad band noise | high current arc counter | (di/dt) counter | high frequency counter |
|---|---|---|---|---|---|
| >aA | >d × peak current | not required | increment | increment | unchanged |
| >aA | >d × peak current | present | increment | increment | increment |
| >aA | >h × peak current | required | increment | unchanged | increment |
| >aA | >e × peak current | required | increment | increment | increment | wherein:
aspect ratio is the peak current divided by the area for one half cycle, area is the sum of the samples for one half cycle;
dt is the time between every other sample of the current waveform, which sample time varies dynamically with the alternating current frequency to get better coverage of a current waveform; and
high frequency broadband noise is the presence of broadband noise during a first number of half cycles on power-up with a load connected and turned on, and during normal operation due to noisy loads at steady state (currents below a peak value of aA).

29. The method of claim 27 and further including determining whether a line to neutral arc fault or a ground fault arc is present in accordance with the following:
If (peak ground fault>a threshold value)
If (peak current>pA for q half cycles and missing half cycle is true and di/dt counter>1 and high current arc counter>1)
If (peak current>pA for s half cycles and missing half cycle is true and high current arc counter>2)
If (peak current>pA for t half cycles and missing half cycle is true and high current arc counter>3)
If (peak current>pA for t half cycles and high current arc counter>3 and di/dt1>di/dt3 and di/dt counter>2)
If (peak current>pA for t half cycles and high current arc counter>3 and di/dt1>di/dt3 and high frequency counter>2 and di/dt counter>1)
If (peak current>pA for >t half cycles and <u half cycles and high current arc counter>3 and missing half cycles is true)
If (peak current>pA for >t half cycles and <u half cycles and high current arc counter >3 and di/dt counter>3)
If (peak current>pA for >t half cycles and <u half cycles and high current arc counter>3 and high frequency counter>1 and di/dt counter>2)
If (peak current>pA for >t half cycles and <u half cycles and high current arc counter>3 and high frequency counter>2 and di/dt counter>1)
If (high current arc>6);
and using the following start-up algorithms:
If (peak1 to peak4>pA and missing half cycle=false) then check the following:
    If (((peak1<(peak3−vA)) and peak1<peak2)) and ((peak2<peak3) and (peak2<peak4−vA)))
        for a tungsten lamp startup, clear the following counters
        high current arc counter
        di/dt counter
        high frequency counter
    ElseIf((peak3>peak1) and (peak5>peak3) and (di/dt1<peak1/2) and (di/dt2<peak2/2) and (di/dt3<peak3/2) and ((di/dt5+wA)>=di/dt3) and ((di/dt3+wA)>=di/dt1) and (slow rise1>aA))
        for an inductive load startup, clear the following counters
        di/dt counter
        high frequency counter;
wherein:
    high current arc is a count in the high current arc counter
    a di/dt2 counter holds the maximum di/dt two half cycles ago
    a di/dt3 counter holds the maximum di/dt three half cycles ago
    a di/dt4 counter holds the maximum di/dt four half cycles ago
    a di/dt5 counter holds the maximum di/dt five half cycles ago
    a peak2 counter holds the peak current of two half cycles ago
    a peak3 counter holds the peak current of three half cycles ago
    a peak4 counter holds the peak current of four half cycles ago
    a peak5 counter holds the peak current of five half cycles ago
    a missing half cycle is true when a nonarcing half cycle follows an arcing half cycle a slow rise1 counter holds the value of peak1−di/dt1 a peak ground fault counter holds a peak ground fault current of the last half cycle; and wherein p, q, s, t, u, v and w are variable numerical values and u>t>s>q.

30. The method of claim 24 wherein if no arcing half cycle is detected in a predetermined amount of time after the last arcing half cycle, then all counters are cleared.

* * * * *